United States Patent
Deng et al.

(10) Patent No.: US 10,755,052 B2
(45) Date of Patent: Aug. 25, 2020

(54) SEMANTIC DISAMBIGUATION METHOD, DEVICE, SERVER AND STORAGE MEDIUM

(71) Applicant: BAIDU ONLINE NETWORK TECHNOLOGY (BEIJING) CO., LTD., Beijing (CN)

(72) Inventors: Liping Deng, Beijing (CN); Peixuan Shi, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 169 days.

(21) Appl. No.: 16/043,494

(22) Filed: Jul. 24, 2018

(65) Prior Publication Data

US 2019/0057082 A1 Feb. 21, 2019

(30) Foreign Application Priority Data

Aug. 21, 2017 (CN) .......................... 2017 1 0718930

(51) Int. Cl.
| | | |
|---|---|---|
| *G06F 17/28* | (2006.01) | |
| *G06F 17/40* | (2006.01) | |
| *G06F 40/30* | (2020.01) | |
| *G06F 40/279* | (2020.01) | |

(52) U.S. Cl.
CPC ............ *G06F 40/30* (2020.01); *G06F 40/279* (2020.01)

(58) Field of Classification Search
CPC ...... G06F 17/28; G06F 17/30; G06F 17/2785; G06F 17/278; G06F 17/289; G06F 17/3084; G06F 19/345
See application file for complete search history.

(56) References Cited

U.S. PATENT DOCUMENTS

| | | | | |
|---|---|---|---|---|
| 8,719,838 | B1* | 5/2014 | Oakes, III | G06F 40/117 719/311 |
| 2012/0016678 | A1* | 1/2012 | Gruber | G06F 9/54 704/275 |
| 2013/0124542 | A1* | 5/2013 | Lee | G06Q 50/01 707/751 |
| 2013/0144899 | A1* | 6/2013 | Lee | G06Q 50/01 707/759 |
| 2013/0275164 | A1* | 10/2013 | Gruber | G10L 17/22 705/5 |
| 2015/0066479 | A1* | 3/2015 | Pasupalak | G06F 40/40 704/9 |
| 2015/0269139 | A1* | 9/2015 | McAteer | G06F 40/30 704/9 |
| 2015/0348551 | A1* | 12/2015 | Gruber | H04M 3/4936 704/235 |
| 2017/0083484 | A1* | 3/2017 | Patil | G06F 40/211 |

(Continued)

*Primary Examiner* — Anne L Thomas-Homescu
(74) *Attorney, Agent, or Firm* — Hodgson Russ LLP

(57) ABSTRACT

The present disclosure provides a semantic disambiguation method, a semantic disambiguation device, a server and a storage medium. The method includes the following. Semantic analysis is performed on a current dialog message input by a user. It is determined, based on an analysis result, whether a current service field corresponding to the current dialog message is an ambiguous field. When the current service field is the ambiguous field, disambiguation is performed on the current service field based on one or more predetermined historical service fields corresponding to one or more historical dialog messages input by the user.

12 Claims, 3 Drawing Sheets

(56) References Cited

U.S. PATENT DOCUMENTS

| | | | |
|---|---|---|---|
| 2017/0177706 A1* | 6/2017 | Ben-Tzur | G06F 16/2457 |
| 2018/0081871 A1* | 3/2018 | Williams | G06F 40/242 |
| 2018/0082032 A1* | 3/2018 | Allen | G06F 19/325 |
| 2018/0176270 A1* | 6/2018 | Griffin | G06Q 10/06311 |
| 2018/0203849 A1* | 7/2018 | Geib | G06F 40/58 |
| 2018/0239837 A1* | 8/2018 | Wang | G06Q 10/1095 |
| 2018/0329885 A1* | 11/2018 | Bull | G06F 16/3334 |
| 2018/0349379 A1* | 12/2018 | Bostick | H04L 51/26 |

\* cited by examiner

SEMANTIC DISAMBIGUATION METHOD, DEVICE, SERVER AND STORAGE MEDIUM

CROSS-REFERENCE TO RELATED APPLICATION

This application is based upon and claims a priority to Chinese Patent Application No. 201710718930.4, filed on Aug. 21, 2017, the entire content of which is incorporated herein by reference.

FIELD

The present disclosure relates to a field of man-machine interaction technologies, and more particularly to a semantic disambiguation method, a semantic disambiguation device, a server and a storage medium.

BACKGROUND

In a dialog system, a user may employ some sentences that omit keywords to chat with the system, which make it difficult for the dialog system to understand an intention of the user. Therefore, the dialog system needs to combine the context to determine the true meaning of the current sentence input by the user.

SUMMARY

As a first aspect, embodiments of the present disclosure provide a semantic disambiguation method. The method includes the following. Semantic analysis is performed on a current dialog message input by a user. It is determined, based on an analysis result, whether a current service field corresponding to the current dialog message is an ambiguous field. When the current service field is the ambiguous field, disambiguation is performed on the current service field based on one or more predetermined historical service fields corresponding to one or more historical dialog messages input by the user.

As a second aspect, embodiments of the present disclosure provide a server. The server includes one or more processors, and a storage device. The storage device is configured to store one or more programs. When the one or more programs are executed by the one or more processors, the one or more processors implement the above method.

As a third aspect, embodiments of the present disclosure provide a computer-readable storage medium having computer programs stored thereon. When the computer programs are executed by a processor, the processor is caused to perform the above method.

DETAILED DESCRIPTION

Figure 1:
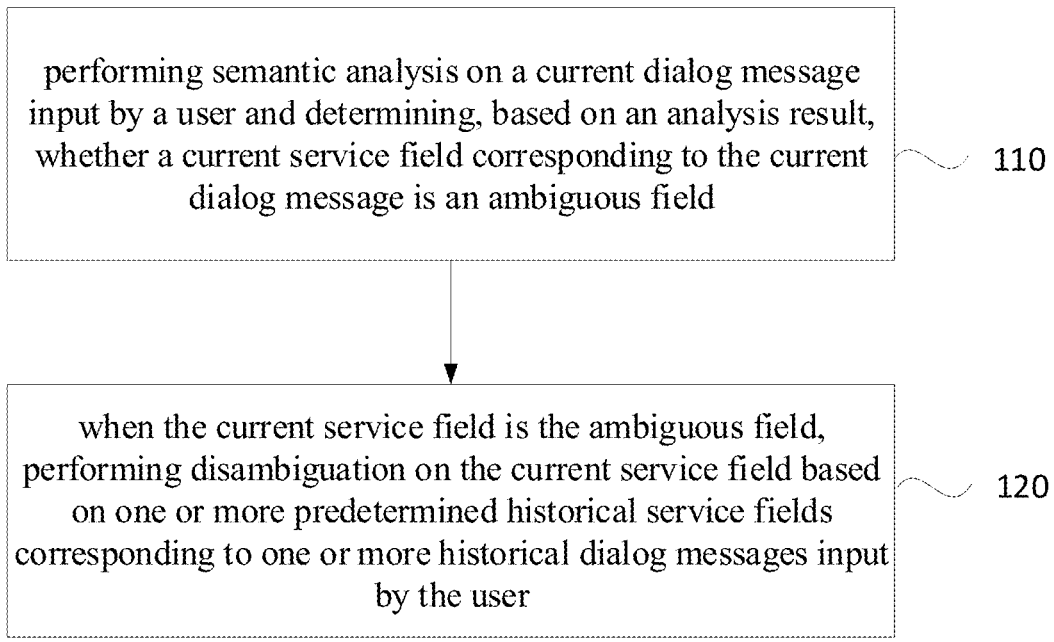
FIG. 1 is a flow chart of a semantic disambiguation method according to embodiment one of the present disclosure.

The present disclosure will be further described in detail below with reference to the drawings and embodiments. It is understood that the specific embodiments described herein are merely illustrative of the present disclosure and are not intended to limit the present disclosure. It should also be noted that, for the convenience of description, only some, but not all, of the structures related to the present disclosure are illustrated in the drawings.

Embodiment One

FIG. 1 is a flow chart of a semantic disambiguation method according to embodiment one of the present disclosure. The embodiment may be suitable to a situation in which a semantic disambiguation is required in a man-machine dialog system. The method may be performed by a semantic disambiguation device. The device may be implemented in a software and/or a hardware. As illustrated in FIG. 1, the method includes the acts in the following blocks.

At block S110, semantic analysis is performed on a current dialog message input by a user, and it is determined, based on an analysis result, whether a current service field corresponding to the current dialog message is an ambiguous field. The current dialog message corresponds to the current service field. In other words, the current dialog message belongs to the current service field.

When the user interacts with (or chats with) the man-machine dialog system, especially a multi-field multi-round dialog system (i.e., a system that includes a plurality of service fields and may engage in a plurality of rounds of dialogs), some colloquial sentences (i.e., the dialog messages) are often used by the user. These sentences usually omit some words that are optional for understanding of the user but are critical for understanding of the dialog system. Therefore, it is difficult for the dialog system to understand a true intention of the user and it is prone to ambiguity. The dialog system needs to disambiguate the current dialog message input by the user.

In the embodiment, the dialog system needs to perform the semantic analysis on the current dialog message input by the user to obtain a general intention of the current sentence (i.e., the dialog message) input by the user, and determines whether the current service field (the current dialog message belongs to the current service field) is ambiguous based on the analysis result of the current dialog message.

In the embodiment, the current dialog message input by the user may be a regular sentence or an ambiguous sentence. Therefore, the semantic analysis includes a regular sentence semantic analysis and an ambiguous sentence semantic analysis. For the regular sentence semantic analysis, the analysis result is certain and unambiguous, and may include both the true intention of the user and the current service field corresponding to the sentence. For the ambiguous sentence semantic analysis, the analytical result is uncertain and ambiguous, and may include the general intention of the user and a plurality of possible service fields corresponding to the sentence.

For example, in a multi-round dialog system including four travel fields, such as booking an air ticket, booking a train ticket, booking a hotel, and querying the weather, if the current dialog message input by the user is "book an air ticket to go to Beijing", obviously, the dialog message is a regular sentence, and the multi-field multi-round dialog system performs the semantic analysis on the current dialog message. The system may obtain the intention of going to Beijing for the user, and also obtain that the current service field corresponding to going to Beijing is booking the air ticket. At this time, the dialog system determines that the current service field corresponding to the current dialog message is not the ambiguous field. If the current dialog message input by the user is "go to Beijing", the dialog message is an ambiguous sentence, and the multi-field multi-round dialog system performs the semantic analysis on the current dialog message. The system may obtain that the general intention of going to Beijing for the user. However, in the dialog system, there are two service fields corresponding to the travel. The true intention of the user may be to book a train ticket to Beijing or book an air ticket to Beijing. It is impossible to determine which service field the user needs by the dialog system only based on the current dialog message. At this time, the dialog system determines that the current service field corresponding to the current dialog message input by the user is the ambiguous field.

At block S120, when the current service field is the ambiguous field, disambiguation is performed on the current service field based on one or more predetermined historical service fields corresponding to one or more historical dialog messages input by the user. One historical dialog message corresponds to one predetermined historical service field. In other words, one historical dialog message belongs to one predetermined historical service field.

In the embodiment, when it is determined that the current service field corresponding to the dialog message currently input by the user is the ambiguous field, a context-based semantic disambiguation strategy may be employed. That is, based on the one or more historical service fields corresponding to the one or more historical dialog messages inputted by the user, in which the one or more historical service fields have been determined, the disambiguation is performed on the current service field.

For example, the multi-round dialog system including four travel fields, such as booking an air ticket, booking a train ticket, booking a hotel, and querying the weather, is still taken as an example. The current dialog message input by the user is "go to Beijing", and the dialog system determines that the current service field corresponding to the current dialog message is the ambiguous field. At this time, the dialog system calls a plurality of rounds of historical dialog messages before the current dialog message and employs the plurality of determined historical service fields corresponding to the plurality of historical dialog messages to determine the current service field corresponding to the current dialog message. If the historical service fields include booking an air ticket, it may be determined that the current service field corresponding to the dialog message "go to Beijing" input by the user is booking an air ticket, and the true intention of the user to chat with the dialog system is further determined as to "book an air ticket to Beijing". At this point, the disambiguation for the current service field corresponding to the current dialog message input by the user is completed.

With the semantic disambiguation method of the embodiments of the present disclosure, by performing the semantic analysis on the current dialog message input by the user, and by employing the analysis result and the corresponding logic processing, the disambiguation may be performed on the current service field in the multi-field multi-round dialog system. The solution improves efficiency and accuracy of the semantic disambiguation and solves the problems that the existing semantic disambiguation method relies on the large-scale annotated corpus and the short sentence cannot be analyzed by the syntax analysis.

Further, in the act of block S110, it is determined, based on the analysis result, whether the current service field corresponding to the current dialog message input by the user is the ambiguous field as follows.

When the current dialog message does not include a field keyword, and the current dialog message includes at least one of a location, a time and a price, it is determined that the current service field is the ambiguous field, in which the field keyword is predetermined according to a service field supported by the multi-field multi-round dialog system.

In the embodiment, the method for determining whether the current service field corresponding to the current dialog message is the ambiguous field may include the following. It is determined whether the analysis result includes a predetermined field keyword. The field keyword is predetermined according to the service field supported by the multi-field multi-round dialog system. If the analysis result includes the predetermined field keyword, it is determined that the current service field corresponding to the current dialog message is not the ambiguous field. If the analysis result does not include the predetermined field keyword, it continues to determine whether the current dialog message includes at least one of the location, the time, and the price. If the current dialog message includes at least one of the location, the time, and the price, it is determined that the current service field corresponding to the current dialog message is the ambiguous field. If the current dialog message does not include at least one of the location, the time, and the price, it is determined that the current dialog message belong to a chatting type message without special purpose, and the current service field corresponding to the current dialog message does not belong to the ambiguous field.

For example, in the multi-round dialog system including four travel fields, such as booking an air ticket, booking a train ticket, booking a hotel, and querying the weather, if the current dialog message input by the user is "book an air ticket to go to Beijing", the dialog system performs the semantic analysis on the current dialog message and the analysis result includes the field keyword, i.e., book an air ticket, of the service field of "booking an air ticket". At this time, it is determined that the current service field corresponding to the current dialog message is not the ambiguous field. If the current dialog message input by the user is "go to Beijing", the dialog system performs the semantic analysis on the current dialog message and the analysis result does not include any field keyword of any service field and includes a location such as Beijing. It indicates that the user may want to travel and the current service field corresponding to the current dialog message is the ambiguity field. If the current dialog message input by the user is "very happy", the dialog system performs the semantic analysis on the current dialog message and the analysis result does not include any field keyword of any service field and does not include any of the location, the time and the price. It indicates that the user is currently conducting a chat with no special purpose. At this time, it is determined that the current service field corresponding to the current dialog message is not the ambiguous field.

The foregoing solution determines whether the current service field corresponding to the current dialog message is the ambiguous field by determining whether the analysis result includes the predetermined field keyword and at least one of the location, the time, and the price, which is simple and effective, thereby improving the efficiency and accuracy of the semantic disambiguation.

Embodiment Two

Figure 2:
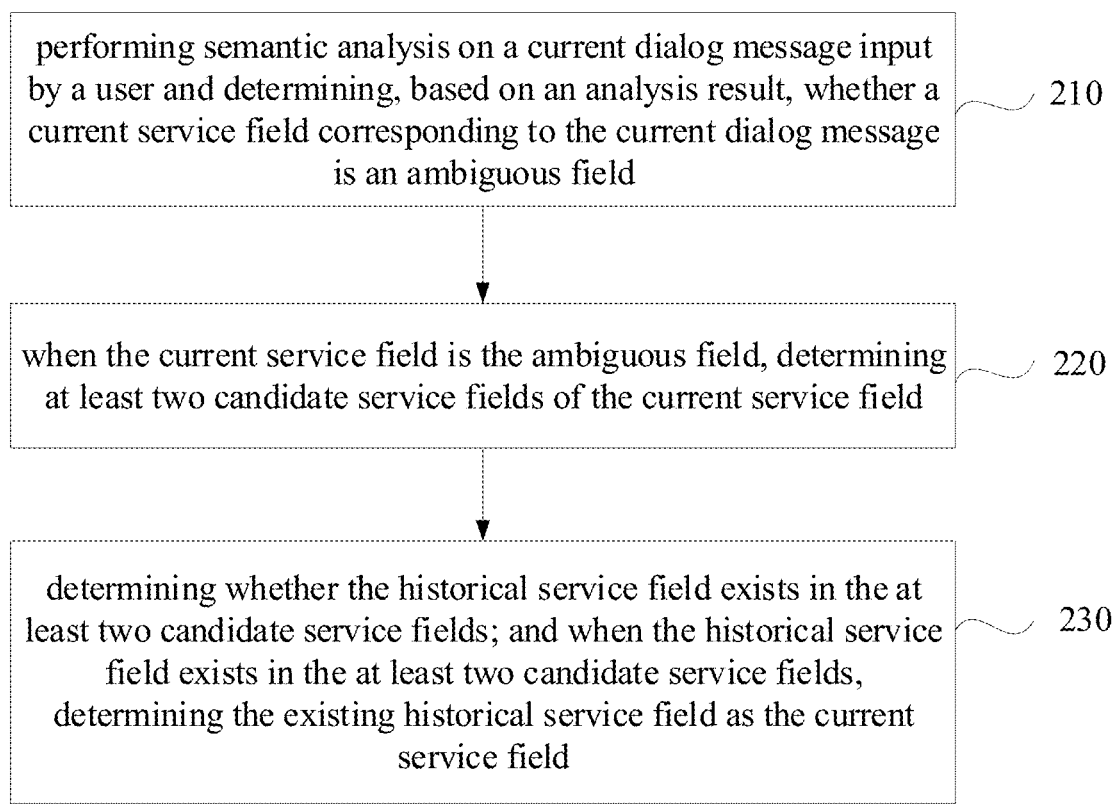
FIG. 2 is a flow chart of a semantic disambiguation method according to embodiment two of the present disclosure.

The embodiment provides a specific implementation of the act in block S120 based on embodiment one. FIG. 2 is a flow chart of a semantic disambiguation method according to embodiment two of the present disclosure. As illustrated in FIG. 2, the method includes the acts in the following blocks.

At block S210, semantic analysis is performed on a current dialog message input by a user, and it is determined, based on an analysis result, whether a current service field corresponding to the current dialog message is an ambiguous field.

At block S220, when the current service field is the ambiguous field, at least two candidate service fields of the current service field are determined.

In the embodiment, if it is determined that the current service field corresponding to the current dialog message is the ambiguous field, the at least two candidate service fields related to the intention of the user may be determined from the service fields supported by the dialog system.

For example, in the multi-round dialog system including four travel fields, such as booking an air ticket, booking a train ticket, booking a hotel, and querying the weather, if the current dialog message input by the user is "go to Beijing", and the dialog system determines that the current service field is the ambiguous field. Then, the dialog system determines that the service fields related to travelling to Beijing are booking an air ticket and booking a train ticket as the candidate service fields of the current service field.

At block S230, it is determined whether the historical service field exists in the at least two candidate service fields, and when the historical service field exists in the at least two candidate service fields, the existing historical service field is determined as the current service field.

In the embodiment, if the current service field corresponding to the current dialog message input by the user is ambiguous, the true intention of the user may not be determined based on the current dialog message. The historical service fields corresponding to the historical dialog messages may be employed, such that it is determined whether the historical service field exists in the at least two candidate service fields by comparing the candidate service fields with the historical service fields.

In the embodiment, if it is determined that the historical service field exists in the at least two candidate service fields, the existing historical service field is determined as the current service field, to complete the disambiguation on the current service field corresponding to the current dialog message input by the user.

For example, in the multi-round dialog system including four travel fields, such as booking an air ticket, booking a train ticket, booking a hotel, and querying the weather, the current dialog message input by the user is "go to Beijing", and the dialog system determines booking an air ticket and booking a train ticket as the at least two candidate service fields of the current service field. The at least two candidate service fields are compared with the historical service fields. If the historical service fields include the service field of booking an air ticket, the historical service field, i.e., booking an air ticket, is taken as the current service field.

With the semantic disambiguation method provided in the embodiment, in the case that the current service field corresponding to the current dialog message input by the user has ambiguity, by determining the at least two candidate service fields of the current service field, and by comparing the at least two candidate service fields with the historical service fields, if it is determined that the historical service field exists the at least two candidate service fields, the existing historical service field is taken as the current service field, thereby completing the disambiguation on the current service field corresponding to the current dialog message input by the user, and further improving the efficiency and accuracy of the semantic disambiguation.

Further, the act in block S230 may be as follows. The one or more historical service fields are traversed from back to front to determine whether there is the historical service field which is the same with any candidate service field. When there is the historical service field which is the same with any candidate service field, the candidate service field is determined as the current service field.

In the embodiment, the historical service fields are traversed from back to front to determine whether there is the historical service field which is the same with any candidate service field. When there is the historical service field which is the same with any candidate service field, the candidate service field is determined as the current service field.

For example, in the multi-round dialog system including four travel fields, such as booking an air ticket, booking a train ticket, booking a hotel, and querying the weather, the current dialog message input by the user is "go to Beijing", and the dialog system determines booking an air ticket and booking a train ticket as the at least two candidate service fields of the current service field. The historical service fields are traversed from back to front to determine whether there is the historical service field which is the same with any candidate service field. If the historical service field obtained after traversing is booking an air ticket, and booking an air ticket exists in the at least two candidate service fields, such that booking an air ticket is taken as the current service field.

Embodiment Three

Figure 3:
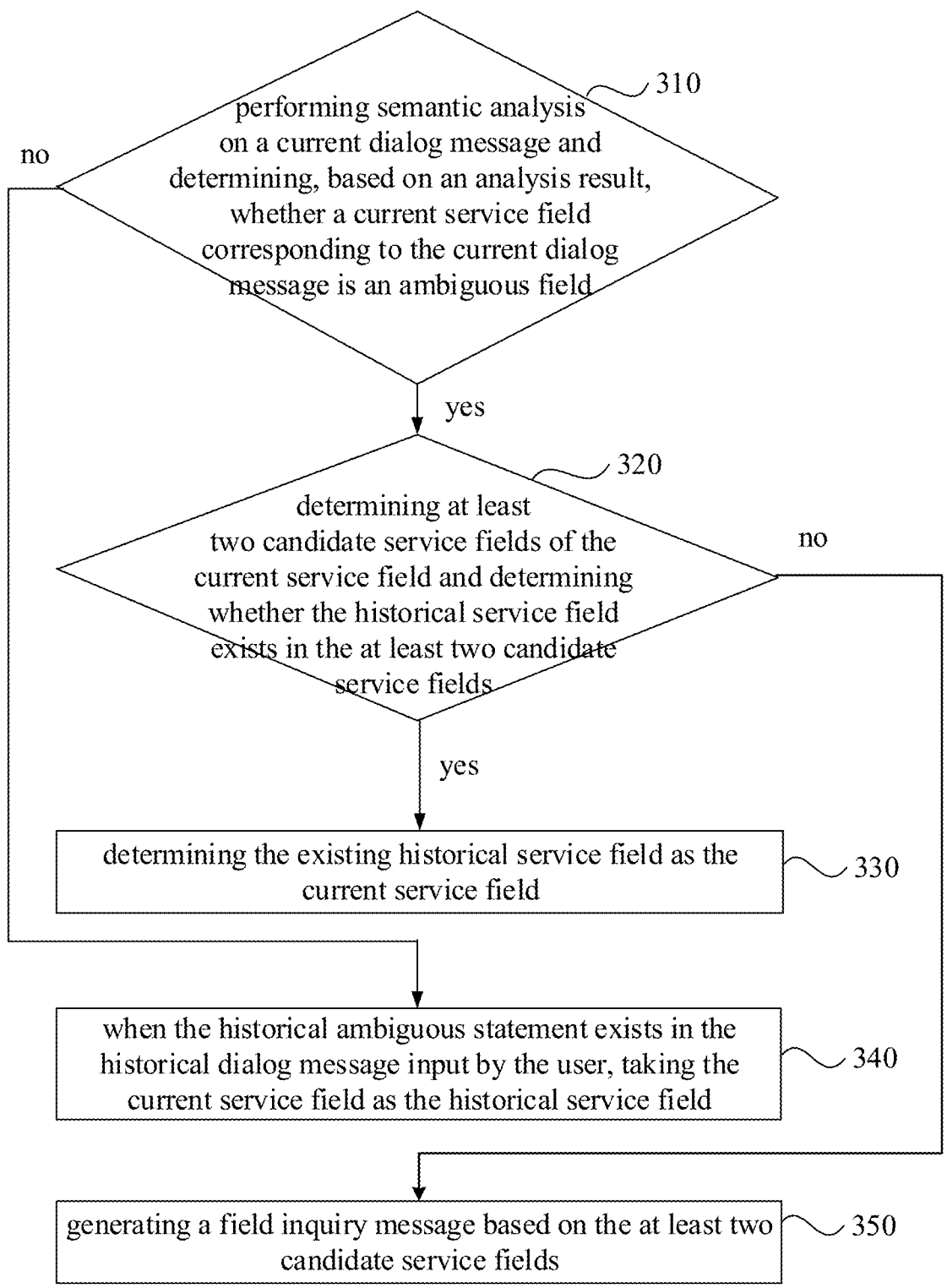
FIG. 3 is a flow chart of a semantic disambiguation method according to embodiment three of the present disclosure.

The embodiment is an improvement on the basis of the foregoing embodiments. FIG. 3 is a flow chart of a semantic disambiguation method according to embodiment three of the present disclosure. As illustrated in FIG. 3, the method includes the acts in the following blocks.

At block S310, semantic analysis is performed on a current dialog message input by a user, and it is determined, based on an analysis result, whether a current service field corresponding to the current dialog message is an ambiguous field. If the current service field is the ambiguous field, the act in block S320 is executed. If the current service field is not the ambiguous field, the act in block S340 is executed.

In detail, after determining whether the current service field is the ambiguous field during the disambiguation process, a type of the current service field may be marked by a type identifier. For example, a bool-type variable, is_ambigious, may be used to identify whether the current dialog message is ambiguous. When is_ambigious=true, the current dialog message is ambiguous. When is_ambigious=false, the current dialog message is not ambiguous.

At block S320, at least two candidate service fields of the current service field are determined, and it is determined whether the historical service field exists in the at least two candidate service fields. When the historical service field exists in the at least two candidate service fields, the act in block S330 is executed. When the historical service field does not exist in the at least two candidate service fields, the act in block S360 is executed.

At block S330, the existing historical service field is determined as the current service field.

In the embodiment, after the current service field corresponding to the current dialog message is determined, the semantics of the current dialog message may be determined, and the response content corresponding to the current dialog message is determined.

At block S340, when it is determined that a historical ambiguous statement exists in the historical dialog message input by the user, the current service field is taken as the historical service field.

In the embodiment, it is determined whether the historical ambiguous statement exists according to the type identifier of the historical dialog message input by the user. For example, by checking whether there is a historical statement of is_ambigious=true to determine whether there is the historical ambiguous statement. If it is determined that the historical ambiguous statement exists in the historical dialog message input by the user, the current service field corresponding to the current dialog message input by the user is determined as the historical service field corresponding to the historical ambiguous statement, to achieve the purpose of disambiguating the historical service field corresponding to the historical ambiguous statement.

For example, in the multi-round dialog system including four travel fields, such as booking an air ticket, booking a train ticket, booking a hotel, and querying the weather, the current dialog message input by the user is "book an air ticket", and the dialog system determines that the current service field of the current dialog message input by the user is "book an air ticket" and is not the ambiguous field. On this basis, if there is a statement "go to Beijing" in the historical dialog message input by the user, the current service field, booking an air ticket, is taken as the historical service field of the historical ambiguous statement "go to Beijing". That is, it is determined that the true intention of the user to chat with the dialog system is to book an air ticket to Beijing.

It should be noted that if it is determined that there is no historical ambiguous statement in the historical dialog message input by the user, the disambiguation operation is not required, and the dialog system may continue to interact with the user.

At block S350, a field inquiry message is generated based on the at least two candidate service fields.

In the embodiment, if it is determined that the historical service field corresponding to the historical dialog message does not exist in at least two candidate service fields, it indicates that the historical dialog message input by the user does not refer to the current service field. In this case, the disambiguation on the current service field corresponding to the current dialog message cannot be completed by using the historical dialog message only. Therefore, the field inquiry message needs to be generated according to the at least two candidate service fields, and is fed back to the user, thereby enabling the user to enter a statement that may assist in disambiguation.

For example, in the multi-round dialog system including four travel fields, such as booking an air ticket, booking a train ticket, booking a hotel, and querying the weather, the current dialog message input by the user is "go to Beijing". At this point, the dialog system may determine that the two candidate service fields of the current service field are booking an air ticket and booking a train ticket. The dialog system may employ the historical service fields corresponding to the historical dialog messages to be compared with the candidate service fields. It is determined that the historical dialog message does not involve the corresponding service field. That is, by analyzing the historical dialog message, the historical service field is not obtained, and the dialog system cannot judge which one of the current service fields (booking an air ticket and booking a train ticket). Therefore, it is necessary to generate the field inquiry message by using the at least two candidate service fields to notify the user to input an auxiliary disambiguation statement. That is, the dialog system may output "do you want to take a train or fly to Beijing?" to the user. After the user gets the feedback, the disambiguation statement is input into the dialog system, for example, "by plane" may be input into the dialog system by the user. At this time, the dialog system may complete the disambiguation on the current service field corresponding to the current dialog message based on the input of the user.

With the semantic disambiguation method provided in the embodiment, in addition to the disambiguation on the current service field corresponding to the current dialog message input by the user, the current service field may be used to perform the disambiguation on the historical service field corresponding to the historical ambiguous statement existing in the historical dialog message input by the user. If the disambiguation on the current service field corresponding to the current dialog message input by the user cannot be completed based on the current dialog message and the historical dialog message, the field inquiry message may be generated based on the candidate service fields, such that the user may input the auxiliary disambiguation statement to complete the disambiguation on the current service field corresponding to the current dialog message input by the user, thereby further improving the efficiency and accuracy of the semantic disambiguation.

Embodiment Four

Figure 4:
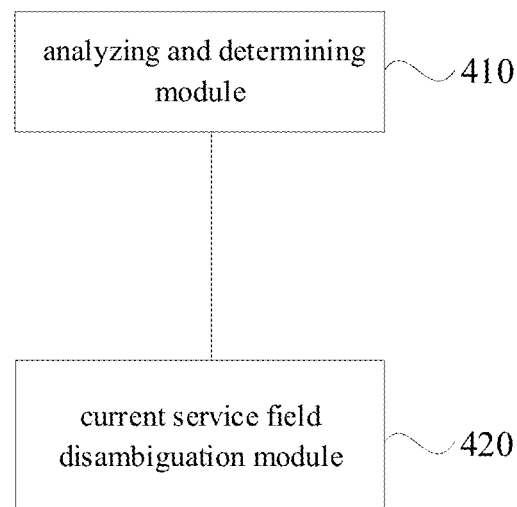
FIG. 4 is a block diagram of a semantic disambiguation device according to embodiment four of the present disclosure.

FIG. 4 is a block diagram of a semantic disambiguation device according to embodiment four of the present disclosure. As illustrated in FIG. 4, the device includes an analyzing and determining module 410 and a current service field disambiguation module 420.

The analyzing and determining module 410 is configured to perform semantic analysis on a current dialog message input by a user, and determine, based on an analysis result, whether a current service field corresponding to the current dialog message is an ambiguous field.

The current service field disambiguation module 420 is configured to, when the current service field is the ambiguous field, perform disambiguation on the current service field based on one or more predetermined historical service fields corresponding to one or more historical dialog messages input by the user.

Further, the current service field disambiguation module 420 includes: a candidate service field determining submodule and a current service field disambiguation submodule.

The candidate service field determining submodule is configured to, when the current service field is the ambiguous field, determine at least two candidate service fields of the current service field.

The current service field disambiguation submodule is configured to, determine whether the historical service field exists in the at least two candidate service fields, and determine the existing historical service field as the current service field when the historical service field exists in the at least two candidate service fields.

Further, the current service field disambiguation submodule is configured to: traverse the one or more historical service fields from back to front to determine whether there is the historical service field which is the same with any candidate service field; and when there is the historical service field which is the same with any candidate service field, determine the candidate service field as the current service field.

Further, the current service field disambiguation module further includes a field inquiry submodule.

The field inquiry submodule is configured to, after determining whether the historical service field exists in the at least two candidate service fields, generate a field inquiry message based on the at least two candidate service fields when the historical service field does not exist in the at least two candidate service fields.

Further, the device further includes a historical service field ambiguity determining module and a historical service field disambiguation module.

The historical service field ambiguity determining module is configured to, after determining based on the analysis result whether the current service field is the ambiguous field, determine whether a historical ambiguous statement exists in the historical dialog message input by the user when the current service field is not the ambiguous field.

The historical service field disambiguation module is configured to, when the historical ambiguous statement exists in the historical dialog message input by the user, take the current service field as the historical service field.

Further, the analyzing and determining module 410 is configured to, when the current dialog message does not comprise a field keyword, and the current dialog message comprises at least one of a location, a time and a price, determine that the current service field is the ambiguous field, in which the field keyword is predetermined according to a service field supported by a multi-field multi-round dialog system.

The semantic disambiguation device provided in the embodiment is the same as the semantic disambiguation method provided by any embodiment of the present disclosure and may perform the semantic disambiguation method provided by any embodiment of the present disclosure, and has the same functional modules and benefits with the semantic disambiguation method. For technical details that are not described in detail in this embodiment, reference may be made to the semantic disambiguation method provided by any embodiment of the present disclosure.

Embodiment Five

Figure 5:
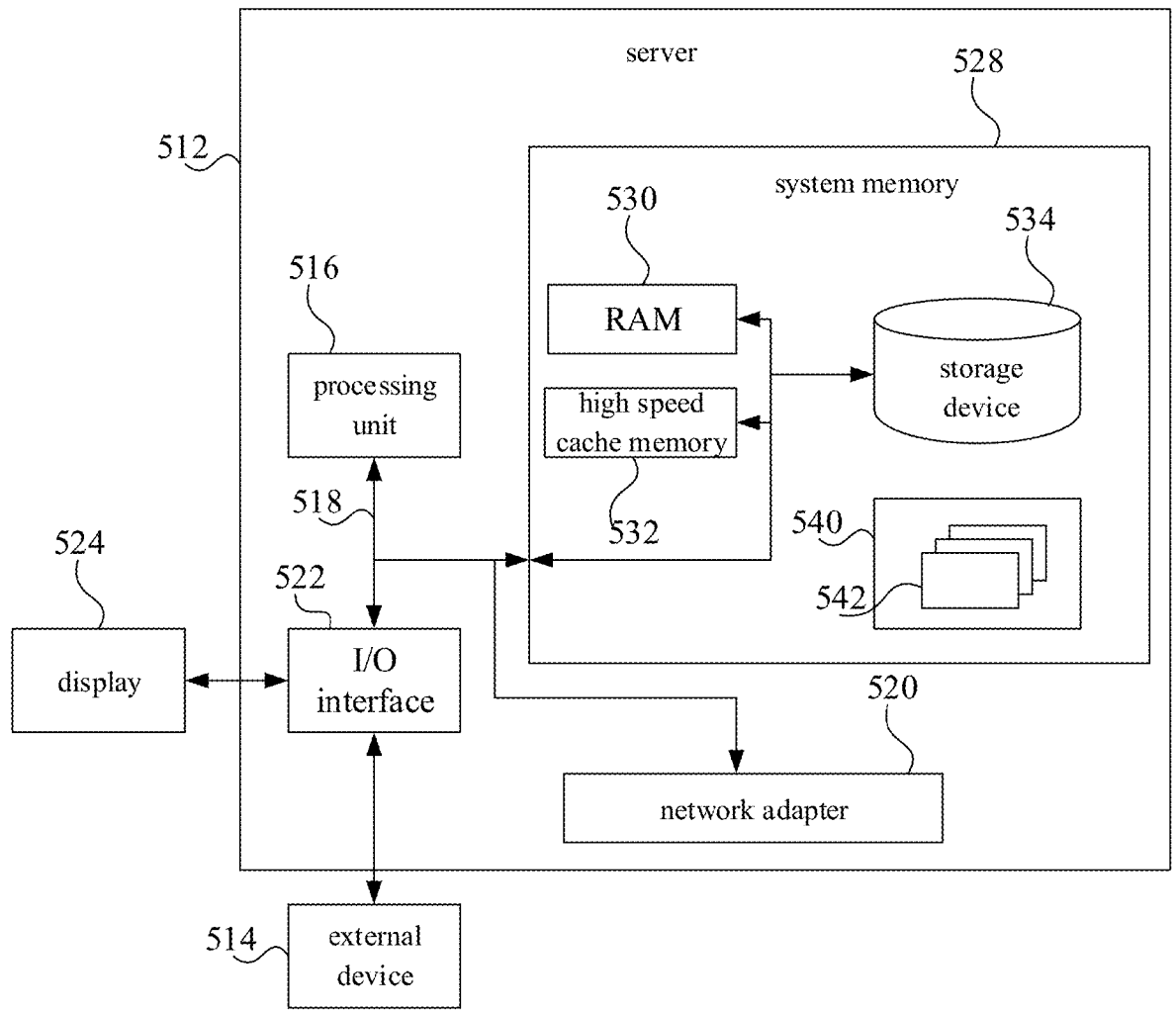
FIG. 5 is a block diagram of a server according to embodiment five of the present disclosure.

FIG. 5 is a block diagram of a server according to embodiment five of the present disclosure. FIG. 5 illustrates a block diagram of an exemplary server 512 suitable for realizing implementations of the present disclosure. The server 512 illustrated in FIG. 5 is merely an example, which should be not understood to limit he functions and usage scope of embodiments of the present disclosure.

As illustrated in FIG. 5, the server 512 may be represented via a general computer device form. Components of the server 512 may include but be not limited to one or more processors or processing units 516, a system memory 528, and a bus 518 connecting various system components including the system memory 528 and the processing units 516.

The bus 518 represents one or more of several types of bus structures, including a memory bus or a memory controller, a peripheral bus, a graphics acceleration port, a processor, or a local bus using any of a variety of bus structures. For example, these architectures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (PCI) bus.

The server 512 typically includes a variety of computer system readable media. These media may be any available media accessible by the server 512 and includes both volatile and non-volatile media, removable and non-removable media.

The system memory 528 may include a computer system readable medium in the form of volatile memory, such as a random access memory (hereinafter referred to as RAM) 530 and/or a high speed cache memory 532. The server 512 may further include other removable or non-removable, volatile or non-volatile computer system storage media. By way of example only, the storage device 534 may be configured to read and write a non-removable and non-volatile magnetic media (not shown in FIG. 5, commonly referred to as a "hard drive"). Although not shown in FIG. 5, a magnetic disk driver for reading from and writing to a removable and non-volatile magnetic disk (such as "floppy disk") and a disk driver for a removable and non-volatile optical disk (such as compact disk read only memory (hereinafter referred to as CD-ROM), Digital Video Disc Read Only Memory (hereinafter referred to as DVD-ROM) or other optical media) may be provided. In these cases, each driver may be connected to the bus 518 via one or more data medium interfaces. The memory 528 may include at least one program product. The program product has a set (such as, at least one) of program modules configured to perform the functions of various embodiments of the present disclosure.

A program/utility 540 having a set (at least one) of the program modules 542 may be stored in, for example, the memory 528. The program modules 542 include but are not limited to, an operating system, one or more application programs, other programs modules, and program data. Each of these examples, or some combination thereof, may include an implementation of a network environment. The program modules 542 generally perform the functions and/or methods in the embodiments described herein.

The server 512 may also communicate with one or more external devices 514 (such as, a keyboard, a pointing device, a display 524, etc.). Furthermore, the computer device 512 may also communicate with one or more communication devices enabling a user to interact with the computer device 512 and/or other devices (such as a network card, modem, etc.) enabling the computer device 512 to communicate with one or more computer devices. This communication can be performed via the input/output (I/O) interface 522. Also, the computer device 512 may communicate with one or more networks (such as a local area network (hereafter referred to as LAN), a wide area network (hereafter referred to as WAN) and/or a public network such as an Internet) through a network adapter 520. As shown in FIG. 5, the network adapter 520 communicates with other modules of the computer device 512 over the bus 518. It should be understood that, although not shown in FIG. 5, other hardware and/or software modules may be used in connection with the computer device 512. The hardware and/or software includes, but is not limited to, microcode, device drivers, redundant processing units, external disk drive arrays, RAID systems, tap Drive and data backup storage system.

The processing unit 516 is configured to execute various functional applications and data processing by running programs stored in the system memory 528, for example, implementing the semantic disambiguation method. The method includes the following.

Semantic analysis is performed on a current dialog message input by a user. It is determined, based on an analysis result, whether a current service field corresponding to the current dialog message is an ambiguous field.

When the current service field is the ambiguous field, disambiguation is performed on the current service field based on one or more predetermined historical service fields corresponding to one or more historical dialog messages input by the user.

Embodiment Six

Embodiment six of the present disclosure also provide a computer-readable storage medium having computer programs stored thereon. When the computer programs are executed by a processor, the processor is caused to perform the above method. The method includes the following.

Semantic analysis is performed on a current dialog message input by a user. It is determined, based on an analysis result, whether a current service field corresponding to the current dialog message is an ambiguous field.

When the current service field is the ambiguous field, disambiguation is performed on the current service field based on one or more predetermined historical service fields corresponding to one or more historical dialog messages input by the user.

The storage medium provided by embodiments of the present disclosure may adopt any combination of one or more computer readable media. The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. A specific example of the computer readable storage media include (a non-exhaustive list): an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In context, the computer readable storage medium may be any tangible medium including or storing programs. The programs may be used by an instruction executed system, apparatus or device, or a connection thereof.

The computer readable signal medium may include a data signal propagating in baseband or as part of a carrier which carries computer readable program codes. Such propagated data signal may be in many forms, including but not limited to an electromagnetic signal, an optical signal, or any suitable combination thereof. The computer readable signal medium may also be any computer readable medium other than the computer readable storage medium, which may send, propagate, or transport programs used by an instruction executed system, apparatus or device, or a connection thereof.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object oriented programming language, such as Java, Smalltalk, C++, as well as conventional procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (hereafter referred as to LAN) or a Wide Area Network (hereafter referred as to WAN).

It should be noted that, the above are only preferred embodiments and applied technical principles of the present disclosure. Those skilled in the art should understand that, the present disclosure is not limited to the specific embodiments described herein, and various obvious changes, readjustments and substitutions that are made by those skilled in the art will not depart from the scope of the present disclosure. Therefore, although the present disclosure has been described in detail by the above embodiments, the present disclosure is not limited to the above embodiments, and more other equivalent embodiments may be included without departing from the concept of the present disclosure, and the scope of the present disclosure is determined by the scope of the appended claims.

What is claimed is:

1. A semantic disambiguation method of a man-machine dialog system, comprising:
    performing, by one or more computing devices, semantic analysis on a current dialog message input by a user into the man-machine dialog system;
    determining, by the one or more computing devices, based on an analysis result, whether a current service field corresponding to the current dialog message is an ambiguous field;
    when the current service field is the ambiguous field, performing, by the one or more computing devices, disambiguation on the current service field based on one or more predetermined historical service fields corresponding to one or more historical dialog messages input by the user;
    determining, by the one or more computing devices, response content corresponding to the current dialog message according to the current service field; and
    sending, by the one or more computing devices, the response content to the user via the man-machine dialog system;
    wherein, when the current service field is the ambiguous field, performing, by the one or more computing devices, disambiguation on the current service field based on the one or more predetermined historical service fields, comprises:
        when the current service field is the ambiguous field, determining, by the one or more computing devices, at least two candidate service fields of the current service field;
        determining, by the one or more computing devices, whether the historical service field exists in the at least two candidate service fields; and
        when the historical service field exists in the at least two candidate service fields, determining, by the one or more computing devices, the existing historical service field as the current service field;

wherein, determining, by the one or more computing devices whether the historical service field exists in the at least two candidate service fields, and when the historical service field exists in the at least two candidate service fields, determining, by the one or more computing devices, the existing historical service field as the current service field, comprises:
    traversing, by the one or more computing devices, the one or more historical service fields from back to front to determine whether there is the historical service field which is the same with any candidate service field; and
    when there is the historical service field which is the same with any candidate service field, determining, by the one or more computing devices, the candidate service field as the current service field.

2. The method of claim 1, wherein, after determining by the one or more computing devices whether the historical service field exists in the at least two candidate service fields, the method further comprises:
    when the historical service field does not exist in the at least two candidate service fields, generating, by the one or more computing devices a field inquiry message based on the at least two candidate service fields.

3. The method of claim 1, wherein, after determining by the one or more computing devices based on the analysis result whether the current service field is the ambiguous field, the method further comprises:
    when the current service field is not the ambiguous field, determining, by the one or more computing devices whether a historical ambiguous statement exists in the historical dialog message input by the user; and
    when the historical ambiguous statement exists in the historical dialog message input by the user, taking, by the one or more computing devices the current service field as the historical service field.

4. The method of claim 1, wherein, determining by the one or more computing devices based on the analysis result whether the current service field is the ambiguous field, comprises:
    when the current dialog message does not comprise a field keyword, and the current dialog message comprises at least one of a location, a time and a price, determining by the one or more computing devices that the current service field is the ambiguous field, in which the field keyword is predetermined according to a service field supported by a multi-field multi-round dialog system.

5. A server of a man-machine dialog system, comprising:
    one or more processors;
    a storage device, configured to store one or more programs,
    wherein when the one or more programs are executed by the one or more processors, the one or more processors implement acts:
        performing semantic analysis on a current dialog message input by a user into the man-machine dialog system;
        determining based on an analysis result, whether a current service field corresponding to the current dialog message is an ambiguous field;
        when the current service field is the ambiguous field, performing disambiguation on the current service field based on one or more predetermined historical service fields corresponding to one or more historical dialog messages input by the user;
        determining response content corresponding to the current dialog message according to the current service field; and
        sending the response content to the user via the man-machine dialog system;
    wherein, when the current service field is the ambiguous field, performing disambiguation on the current service field based on the one or more predetermined historical service fields, comprises:
        when the current service field is the ambiguous field, determining at least two candidate service fields of the current service field;
        determining whether the historical service field exists in the at least two candidate service fields; and
        when the historical service field exists in the at least two candidate service fields, determining, the existing historical service field as the current service field;
    wherein, determining whether the historical service field exists in the at least two candidate service fields, and when the historical service field exists in the at least two candidate service fields, determining the existing historical service field as the current service field, comprises:
        traversing the one or more historical service fields from back to front to determine whether there is the historical service field which is the same with any candidate service field; and
        when there is the historical service field which is the same with any candidate service field, determining the candidate service field as the current service field.

6. The server of claim 5, wherein when the one or more programs are executed by the one or more processors, the one or more processors further implement acts:
    when the historical service field does not exist in the at least two candidate service fields, generating a field inquiry message based on the at least two candidate service fields.

7. The server of claim 5, wherein when the one or more programs are executed by the one or more processors, the one or more processors further implement acts:
    when the current service field is not the ambiguous field, determining whether a historical ambiguous statement exists in the historical dialog message input by the user; and
    when the historical ambiguous statement exists in the historical dialog message input by the user, taking the current service field as the historical service field.

8. The server of claim 5, wherein, determining based on the analysis result whether the current service field is the ambiguous field, comprises:
    when the current dialog message does not comprise a field keyword, and the current dialog message comprises at least one of a location, a time and a price, determining that the current service field is the ambiguous field, in which the field keyword is predetermined according to a service field supported by a multi-field multi-round dialog system.

9. A non-transitory computer-readable storage medium of a man-machine dialog system having computer programs stored thereon, wherein when the computer programs are executed by a processor, the processor is caused to perform acts:
    performing semantic analysis on a current dialog message input by a user into the man-machine dialog system;
    determining based on an analysis result, whether a current service field corresponding to the current dialog message is an ambiguous field;

when the current service field is the ambiguous field, performing disambiguation on the current service field based on one or more predetermined historical service fields corresponding to one or more historical dialog messages input by the user;

determining response content corresponding to the current dialog message according to the current service field; and sending the response content to the user via the man-machine dialog system;

wherein, when the current service field is the ambiguous field, performing disambiguation on the current service field based on the one or more predetermined historical service fields, comprises:

when the current service field is the ambiguous field, determining at least two candidate service fields of the current service field;

determining whether the historical service field exists in the at least two candidate service fields; and when the historical service field exists in the at least two candidate service fields, determining, the existing historical service field as the current service field;

wherein, determining whether the historical service field exists in the at least two candidate service fields, and when the historical service field exists in the at least two candidate service fields, determining the existing historical service field as the current service field, comprises:

traversing the one or more historical service fields from back to front to determine whether there is the historical service field which is the same with any candidate service field; and when there is the historical service field which is the same with any candidate service field, determining the candidate service field as the current service field.

10. The storage medium of claim 9, wherein when the computer programs are executed by a processor, the processor is caused to perform further acts:

when the historical service field does not exist in the at least two candidate service fields, generating a field inquiry message based on the at least two candidate service fields.

11. The storage medium of claim 9, wherein when the computer programs are executed by a processor, the processor is caused to perform further acts:

when the current service field is not the ambiguous field, determining whether a historical ambiguous statement exists in the historical dialog message input by the user; and when the historical ambiguous statement exists in the historical dialog message input by the user, taking the current service field as the historical service field.

12. The storage medium of claim 9, wherein when the computer programs are executed by a processor, the processor is caused to perform further acts:

when the current dialog message does not comprise a field keyword, and the current dialog message comprises at least one of a location, a time and a price, determining that the current service field is the ambiguous field, in which the field keyword is predetermined according to a service field supported by a multi-field multi-round dialog system.

* * * * *